(No Model.) 2 Sheets—Sheet 1.

W. HECKERT.
CABLE CONDUIT AND TRUCK.

No. 382,810. Patented May 15, 1888.

(No Model.) 2 Sheets—Sheet 2.
W. HECKERT.
CABLE CONDUIT AND TRUCK.
No. 382,810. Patented May 15, 1888.
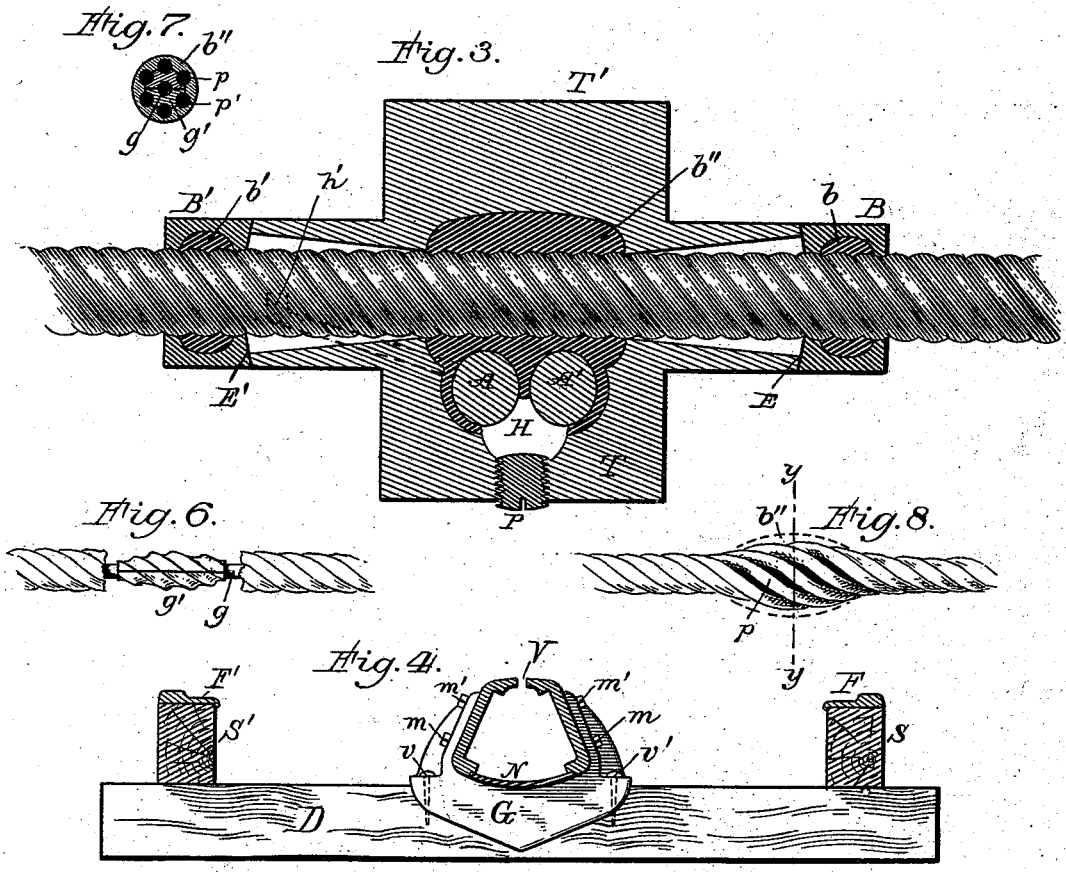
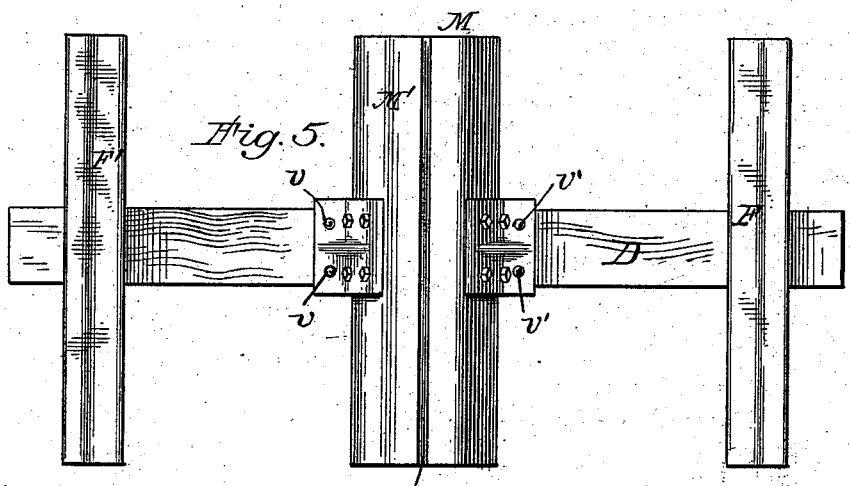
Attest:
Howell Bartle
A. P. Smith
Inventor
Wm Heckert by
Benj Butterworth,
his Atty

UNITED STATES PATENT OFFICE.

WILLIAM HECKERT, OF YONKERS, NEW YORK, ASSIGNOR TO BENJ. BUTTERWORTH, TRUSTEE, OF CINCINNATI, OHIO.

CABLE CONDUIT AND TRUCK.

SPECIFICATION forming part of Letters Patent No. 382,810, dated May 15, 1888.

Application filed February 13, 1888. Serial No. 263,869. (No model.)

*To all whom it may concern:*

Be it known that I, WILLIAM HECKERT, a citizen of the United States, residing at Yonkers, in the county of Westchester and State of New York, have invented certain new and useful Improvements in Cable Conduits and Trucks; and I do hereby declare the following to be a full, clear, and exact description of the invention, such as will enable others skilled in the art to which it appertains to make and use the same.

My invention consists of the improved construction of cable-conduits and cable-trucks, hereinafter to be described and illustrated.

Figure 1:
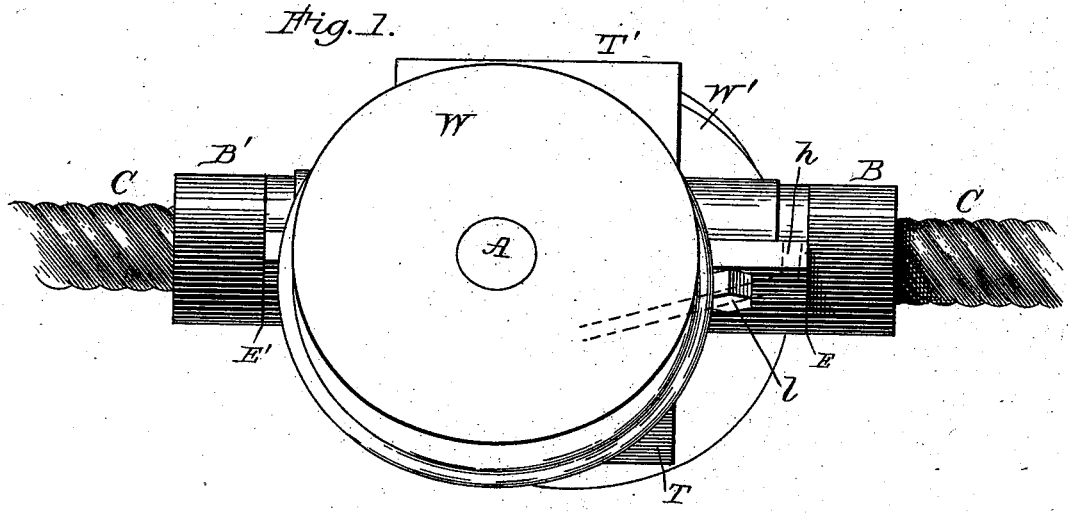
Figure 2:
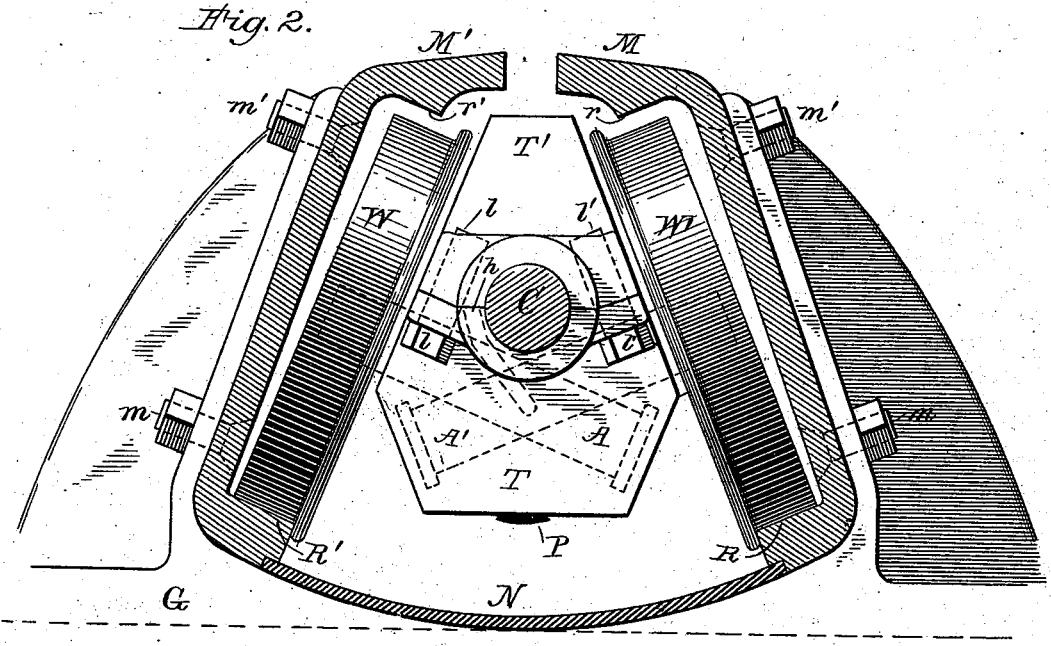

Figure 1 shows a side view of the cable and cable-truck. Fig. 2 shows a cross-section of the conduit with the truck in it. Fig. 3 shows a side view of the cable with a longitudinal axial section of the cable-truck and the buttons at the ends of the same. Fig. 4 shows the position of the conduit in the road-bed and the way in which it is fastened to the ties. Fig. 5 is a plan view of Fig. 4. Fig. 6 is a side view of the cable-center with its surrounding mass of soft metal. Fig. 7 is a cross-section on line Y Y, Fig. 8, showing the cable-center with its surrounding mass of soft metal, the cable-strands, and the secondary mass of soft metal inclosing the strands and separating them one from another. Fig. 8 is a side view of Fig. 7, the secondary mass of soft metal being removed, its position being indicated by dotted lines.

Like letters refer to like parts throughout the drawings.

The cable truck and conduit herein illustrated are designed to form part of my cable-railway system as described in this and two other applications filed of even date herewith, Serial Nos. 263,868 and 263,870.

The cable C is supported at each interval of about sixty-eight inches by a two-part truck, T T', which surrounds it and is bolted together by the bolts $l\ l'$. This truck has two wheels, W W', whose axes A A' run in journal-bearings in the part T of the truck. The upper part of the truck extends upward in the form of a projection, T', which engages the teeth of the sprocket-chain on the car. (Not shown in this application.)

The track and conduit are shown in Figs. 2, 4, and 5. The rails F F' rest upon the sleepers S S', which are held together by the tie D. To the tie D is fastened the double bracket G' by the bolts or spikes $v\ v'$. The double bracket G supports the two inclined side pieces, M M', of the conduit by the bolts $m\ m'$. Upon these side pieces are formed the two pairs of rails R R' and $r\ r'$, upon which the truck-wheels W W' run. The bottom piece, N, is held in place by the overlapping side pieces, M M'.

I support my truck upon the cable at three independent points, thus equalizing the strain upon the cable-strands. The central cavity of the truck-frame is filled in with Babbitt or other soft metal, $b''$, which enters the space between the strands and sets in cooling. In the same way the buttons B B'—one at each end of the truck-frame—are fastened to the cable by the Babbitt metal, $b$ and $b'$. The tubular extensions of the truck-frame are made bell-mouthed, as shown in Fig. 3. Thus the cable in going around curves may bend gradually within these extensions and not sharply at their ends, as would otherwise be the case. The ends E E' of these extensions are turned off in the form of a spherical surface whose center is the center of the truck-frame. The inner ends of the buttons B B' are turned to correspond, and thus the buttons always bear against the ends of the truck-frame and relieve the Babbitt metal, $b''$, of a part of the strain.

The upper part, T', of the truck-frame is provided with suitable oil-ducts, $h\ h'$. The Babbitt metal $b''$ is poured into the truck through a hole in the part T, stopped by the plug P. After the Babbitt metal has cooled, the cavity H is dug out. This may be filled with cotton waste, which will absorb the oil used in lubricating the journals A A', which are in part exposed in the cavity H, as shown in Fig. 3.

Fig. 3 shows the conventional method of fastening the truck-frame and buttons to the cable. My improved method is shown in Figs. 6, 7, and 8. The strands $p\ p'$, &c., of the cable are picked apart, and the two-part spirally-corrugated egg-shaped mass of soft metal, $g'$, is placed about the cable-center $g$. The cable is then subjected to tension and the strands allowed to settle into the corrugations on $g'$. The truck-frame or button, as the case may be, is then placed about the cable and the entire cavity, including the space between the cable-strands, is filled in with a secondary mass of soft metal, $b''$. Thus a firm grip is secured upon each and every strand.

The operation and advantages of my peculiar construction not hereinbefore set out are these: The axial line of each truck-wheel passing through the tread of the opposite wheel and the rail on which it runs, the latter forms a natural fulcrum about which the truck may revolve. Thus, if the cable is bent to the right, Fig. 2, in rounding a curve when the lateral strain exceeds the vertical strain the truck will revolve about the point R, and the wheel W will lift and roll on the upper rail, $r'$, so the curve is rounded with the least possible amount of grinding and with no skidding of the wheels.

The inclined sides of the conduit allow the earth when expanded by frost to slide up the sides, instead of forcing them together and closing the slots. The central slot, V, enables the two side pieces of the conduit to be duplicates, thus requiring but one pair of rolls in their manufacture and avoiding the difficulties incurred in rolling the long flange required where the slot is at one side, as in the ordinary construction in this system of cable roads now in use.

The bottom piece, M, is held secure by the overlapping side pieces, but may be taken up at any time by simply removing one of the side pieces, while there are no bolts or bolt-holes in it to be rusted out by the moisture accumulating at the bottom.

The inclined sides M M' of the conduit having the inclined rails R R' at the bottom and at the point farthest from the slot protect the rails from falling dirt, &c., so that the truck-wheels run easily and quietly. The inclined surface of the rails affords a lateral as well as a vertical support to the rails, so that no curve system of rollers or pulleys is necessary at the bends in the line. Such systems are a necessity in all other cable roads, and are costly, absorb much power, and rapidly destroy the cable.

Having therefore described my invention, what I claim as new, and desire to protect by Letters Patent, is—

1. In combination, a cable-conduit for traction-cable railroads having an upper and a lower pair of rails, the cable-truck supported by wheels running normally upon the lower set of rails and having its wheels inclined one toward the other, so that the axial line of each passes through the rail upon which the other runs, substantially as described.

2. A cable-truck for traction-cable railroads having its wheels so inclined one to the other that the axial line of each wheel passes through the tread of the other, substantially as described.

3. A cable-conduit of trapezoidal cross-section having, in combination, the double bracket, the inclined side pieces supported by the brackets and separated by a central overhead slot, and the floor-piece held in place by the overlapping side pieces, substantially as described.

4. A cable-truck for traction-cable railways having three separate and independent points of support upon the cable, substantially as described.

5. In a cable-truck for traction-cable railways, the truck-frame centered on a ball of soft metal and having tubular bell-mouthed extensions surrounding the cable, in combination with the two auxiliary buttons, one at each end of the truck-frame, each centered upon its ball of soft metal, the bearing-surfaces of the buttons, and truck-extension forming portions of the surface of a sphere whose center coincides with that of the truck-frame, substantially as described.

6. A cable-truck frame having the central cavity connected with inclined journal-bearings, in combination with the plugged oil-hole leading to the same, substantially as described.

7. An organization of parts designed to secure a button upon a cable, consisting of the following combination: the cable-center, the two-part egg-shaped mass of soft metal surrounding the cable-center and provided with spiral corrugations, the surrounding cable-strands fitting into the said corrugations, and the secondary mass of soft metal surrounding and separating the strands, substantially as described.

8. In a cable road, the conduit having inclined sides and inclined rails forming a track for a cable-truck, in combination with a truck having its wheels and axles inclined one toward another and provided with an upward projection for engaging with the sprockets on a chain-grip, substantially as described.

9. A cable-truck having its wheels inclined one toward the other, substantially as described.

In testimony whereof I affix my signature in presence of two witnesses.

WILLIAM HECKERT.

Witnesses:
FRANK HECKERT,
LAURA A. HECKERT.